US012794614B2

(12) United States Patent
Han et al.

(10) Patent No.: US 12,794,614 B2
(45) Date of Patent: Nov. 10, 2026

(54) SCell DORMANCY SWITCHING WITH SCell-PCell CROSS-CARRIER SCHEDULING

(71) Applicant: Intel Corporation, Santa Clara, CA (US)

(72) Inventors: Seunghee Han, San Jose, CA (US); Yingyang Li, Beijing (CN); Yi Wang, Beijing (CN)

(73) Assignee: Intel Corporation, Santa Clara, CA (US)

(*) Notice: Subject to any disclaimer, the term of this patent is extended or adjusted under 35 U.S.C. 154(b) by 322 days.

(21) Appl. No.: 18/278,749

(22) PCT Filed: May 11, 2022

(86) PCT No.: PCT/US2022/028673

§ 371 (c)(1),
(2) Date: Aug. 24, 2023

(87) PCT Pub. No.: WO2022/240923

PCT Pub. Date: Nov. 17, 2022

(65) Prior Publication Data

US 2024/0195549 A1 Jun. 13, 2024

Related U.S. Application Data

(60) Provisional application No. 63/315,826, filed on Mar. 2, 2022, provisional application No. 63/315,393, filed (Continued)

(51) Int. Cl.
*H04L 5/00* (2006.01)
*H04W 72/232* (2023.01)

(52) U.S. Cl.
CPC .......... *H04L 5/0035* (2013.01); *H04L 5/0094* (2013.01); *H04L 5/0098* (2013.01); *H04W 72/232* (2023.01)

(58) Field of Classification Search
CPC ... H04L 5/0035; H04L 5/0094; H04L 5/0098; H04L 5/0053; H04L 5/001;
(Continued)

(56) References Cited

U.S. PATENT DOCUMENTS

2016/0234841 A1* 8/2016 Pao ....................... H04W 72/54
2020/0313833 A1 10/2020 Yi et al.
(Continued)

FOREIGN PATENT DOCUMENTS

WO WO-2021062877 A1 4/2021
WO WO-2022240923 A1 11/2022

OTHER PUBLICATIONS

"International Application Serial No. PCT/US2022/028673, International Search Report mailed Aug. 23, 2022", 3 pgs.
(Continued)

*Primary Examiner* — Ayaz R Sheikh
*Assistant Examiner* — Tarell A Hampton
(74) *Attorney, Agent, or Firm* — Schwegman Lundberg & Woessner, P.A.

(57) ABSTRACT

An apparatus and system are described to support secondary cell (SCell) dormancy switching when cross-carrier scheduling (CCS) from SCell to primary cell (PCell) transmission is supported are described. A physical downlink control channel (PDCCH) transmission on the sSCell has a downlink control information format (DCI) format 0_1 or 1_1 containing a SCell dormancy indication field and a CIF are used to indicate CCS and SCell dormancy switching to deactivate the SCell. The CIF value is either 0 or indicates the PCell and may depend on whether physical downlink shared channel (PDSCH) transmission is scheduled. The DCI triggers bandwidth part (BWP) switching for the PCell to indicate to the UE to switch to monitoring UE-specific search space sets on the PCell instead of on the SCell.

17 Claims, 8 Drawing Sheets

Related U.S. Application Data on Mar. 1, 2022, provisional application No. 63/248,861, filed on Sep. 27, 2021, provisional application No. 63/187,124, filed on May 11, 2021.

(58) Field of Classification Search
CPC ............... H04W 72/232; H04W 72/23; H04W 52/0206; H04W 72/0457; H04W 72/231
See application file for complete search history.

(56) References Cited

U.S. PATENT DOCUMENTS

| | | | | |
|---|---|---|---|---|
| 2021/0045147 | A1 | 2/2021 | Zhou et al. | |
| 2022/0046662 | A1* | 2/2022 | Takeda | H04W 72/1263 |
| 2022/0330156 | A1* | 10/2022 | Zhou | H04W 52/0206 |

OTHER PUBLICATIONS

"International Application Serial No. PCT/US2022/028673, Written Opinion mailed Aug. 23, 2022", 4 pgs.
Intel, Corporation, "On SCell scheduling PCell transmissions", R1-2103052, 3GPP TSG RAN WG1 Meeting #104_E, e-Meeting, (Apr. 7, 2021).
Spreadtrum, Communications, "Discussion on cross-carrier scheduling from SCell to PCell", R1-2102471, 3GPP TSG RAN WG1 #104b-e, e-Meeting, (Apr. 7, 2021).
"International Application Serial No. PCT/US2022/028673, International Preliminary Report on Patentability mailed Nov. 23, 2023", 6 pgs.
"Japanese Application Serial No. 2023-558969, Response filed Jun. 1, 2026 to Notification of Reasons for Refusal mailed Mar. 3, 2026", w English Claims, 15 pgs.

* cited by examiner

SCell DORMANCY SWITCHING WITH SCell-PCell CROSS-CARRIER SCHEDULING

PRIORITY CLAIM

This application is a U.S. National Stage Filing under 35 U.S.C. 371 from International Application No. PCT/US2022/028673, filed May 11, 2022 and published in English as WO 2022/240923 on Nov. 17, 2022, which claims the benefit of priority to U.S. Provisional Patent Application Ser. No. 63/187,124, filed May 11, 2021, U.S. Provisional Patent Application Ser. No. 63/248,861, filed Sep. 27, 2021, U.S. Provisional Patent Application Ser. No. 63/315,393, filed Mar. 1, 2022, and U.S. Provisional Patent Application Ser. No. 63/315,826, filed Mar. 2, 2022, each of which is incorporated herein by reference in its entirety.

TECHNICAL FIELD

Embodiments pertain to next generation (NG) wireless communications. Some embodiments relate to secondary cells (SCells) in NG wireless communication systems. In particular, some embodiments relate to SCell dormancy switching with cross-carrier scheduling from the SCell to the primary cell (PCell).

BACKGROUND

The use and complexity of next generation (NG) or new radio (NR) wireless systems, which include 5G networks and are starting to include sixth generation (6G) networks among others, has increased due to both an increase in the types of devices user equipment (UEs) using network resources as well as the amount of data and bandwidth being used by various applications, such as video streaming, operating on these UEs. With the vast increase in number and diversity of communication devices, the corresponding network environment, including routers, switches, bridges, gateways, firewalls, and load balancers, has become increasingly complicated. As expected, a number of issues abound with the advent of any new technology.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
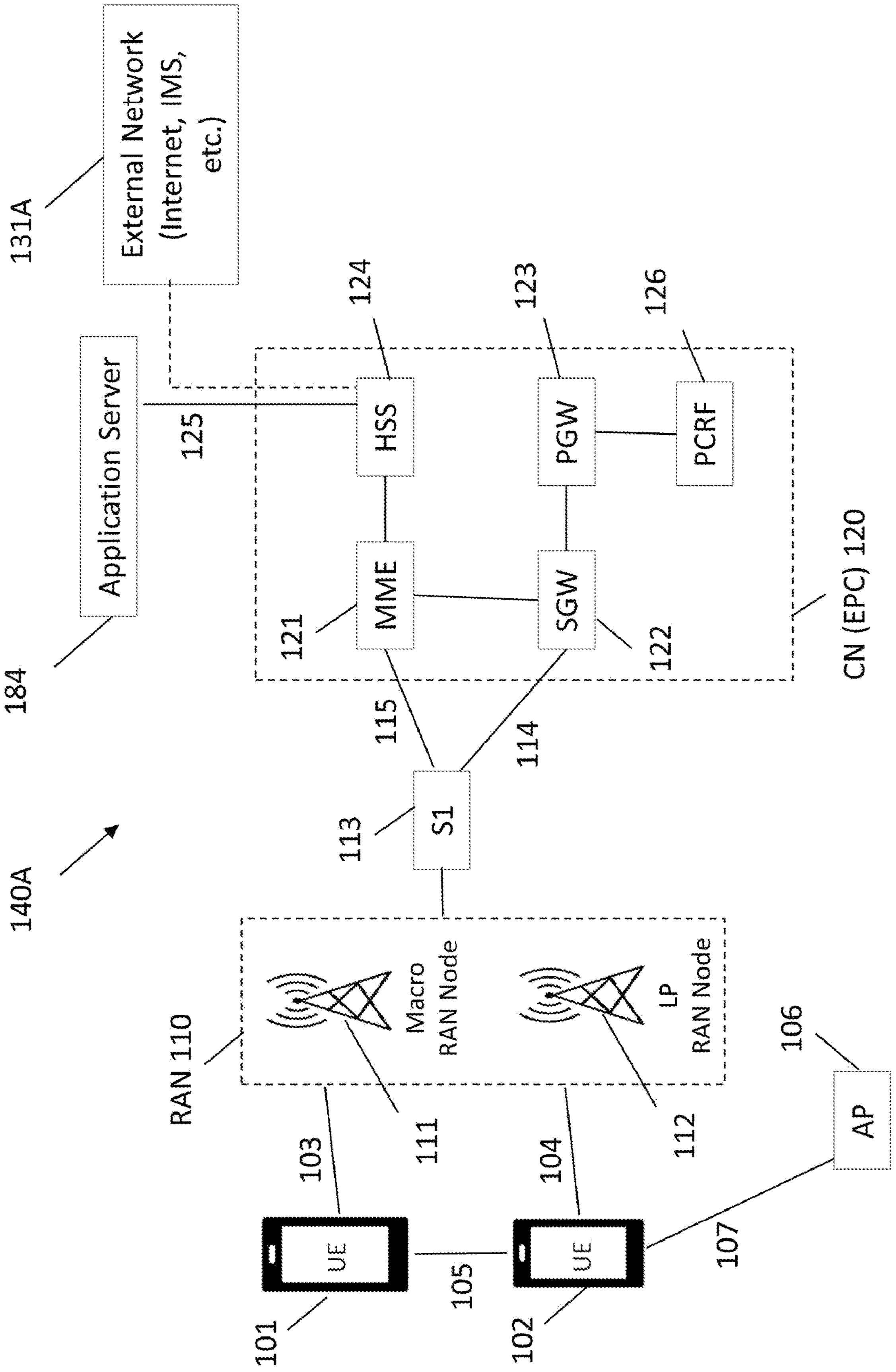
FIG. 1A illustrates an architecture of a network, in accordance with some aspects.

FIG. 1A illustrates an architecture of a network in accordance with some aspects. The network 140A includes 3GPP LTE/4G and NG network functions that may be extended to 6G functions. Accordingly, although 5G will be referred to, it is to be understood that this is to extend as able to 6G structures, systems, and functions. A network function can be implemented as a discrete network element on a dedicated hardware, as a software instance running on dedicated hardware, and/or as a virtualized function instantiated on an appropriate platform, e.g., dedicated hardware or a cloud infrastructure.

The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as portable (laptop) or desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard. Any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and other frequencies and Spectrum Access System (SAS) in 3.55-3.7 GHz and other frequencies). Different Single Carrier or Orthogonal Frequency Domain Multiplexing (OFDM) modes (CP-OFDM, SC-FDMA, SC-OFDM, filter bank-based multicarrier (FBMC), OFDMA, etc.), and in particular 3GPP NR, may be used by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network. In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The RAN 110 may contain one or more gNBs, one or more of which may be implemented by multiple units. Note that although gNBs may be referred to herein, the same aspects may apply to other generation NodeBs, such as $6^{th}$ generation NodeBs—and thus is more generally referred to as Radio Access Network node (RANnode).

Each of the gNBs may implement protocol entities in the 3GPP protocol stack, in which the layers are considered to be ordered, from lowest to highest, in the order Physical (PHY), Medium Access Control (MAC), Radio Link Control (RLC), Packet Data Convergence Control (PDCP), and Radio Resource Control (RRC)/Service Data Adaptation Protocol (SDAP) (for the control plane/user plane). The protocol layers in each gNB may be distributed in different units—a Central Unit (CU), at least one Distributed Unit (DU), and a Remote Radio Head (RRH). The CU may provide functionalities such as the control the transfer of user data, and effect mobility control, radio access network sharing, positioning, and session management, except those functions allocated exclusively to the DU.

The higher protocol layers (PDCP and RRC for the control plane/PDCP and SDAP for the user plane) may be implemented in the CU, and the RLC and MAC layers may be implemented in the DU. The PHY layer may be split, with the higher PHY layer also implemented in the DU, while the lower PHY layer is implemented in the RRH. The CU, DU and RRH may be implemented by different manufacturers, but may nevertheless be connected by the appropriate interfaces therebetween. The CU may be connected with multiple DUs.

The interfaces within the gNB include the E1 and front-haul (F) F1 interface. The E1 interface may be between a CU control plane (gNB-CU-CP) and the CU user plane (gNB-CU-UP) and thus may support the exchange of signaling information between the control plane and the user plane through E1AP service. The E1 interface may separate Radio Network Layer and Transport Network Layer and enable exchange of UE associated information and non-UE associated information. The E1AP services may be non UE-associated services that are related to the entire E1 interface instance between the gNB-CU-CP and gNB-CU-UP using a non UE-associated signaling connection and UE-associated services that are related to a single UE and are associated with a UE-associated signaling connection that is maintained for the UE.

The F1 interface may be disposed between the CU and the DU. The CU may control the operation of the DU over the F1 interface. As the signaling in the gNB is split into control plane and user plane signaling, the F1 interface may be split into the F1-C interface for control plane signaling between the gNB-DU and the gNB-CU-CP, and the F1-U interface for user plane signaling between the gNB-DU and the gNB-CU-UP, which support control plane and user plane separation. The F1 interface may separate the Radio Network and Transport Network Layers and enable exchange of UE associated information and non-UE associated information. In addition, an F2 interface may be between the lower and upper parts of the NR PHY layer. The F2 interface may also be separated into F2-C and F2-U interfaces based on control plane and user plane functionalities.

The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a 5G protocol, a 6G protocol, and the like.

In an aspect, the UEs 101 and 102 may further directly exchange communication data via a ProSe interface 105. The ProSe interface 105 may alternatively be referred to as a sidelink (SL) interface comprising one or more logical channels, including but not limited to a Physical Sidelink Control Channel (PSCCH), a Physical Sidelink Shared Channel (PSSCH), a Physical Sidelink Discovery Channel (PSDCH), a Physical Sidelink Broadcast Channel (PSBCH), and a Physical Sidelink Feedback Channel (PSFCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a gNB, an eNB, or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the CN 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VOIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G or 6G network, including 5G new radio network using communications in the licensed (5G NR) and the unlicensed (5G NR-U) spectrum. One of the current enablers of IT is the narrowband-IoT (NB-IoT). Operation in the unlicensed spectrum may include dual connectivity (DC) operation and the standalone LTE system in the unlicensed spectrum, according to which LTE-based technology solely operates in unlicensed spectrum without the use of an "anchor" in the licensed spectrum, called MulteFire. Further enhanced operation of LTE systems in the licensed as well as unlicensed spectrum is expected in future releases and 5G systems. Such enhanced operations can include techniques for sidelink resource allocation and UE processing behaviors for NR sidelink V2X communications.

An NG system architecture (or 6G system architecture) can include the RAN 110 and a core network (CN) 120. The NG-RAN 110 can include a plurality of nodes, such as gNBs and NG-eNBs. The CN 120 (e.g., a 5G core network (5GC)) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes. In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 1B:
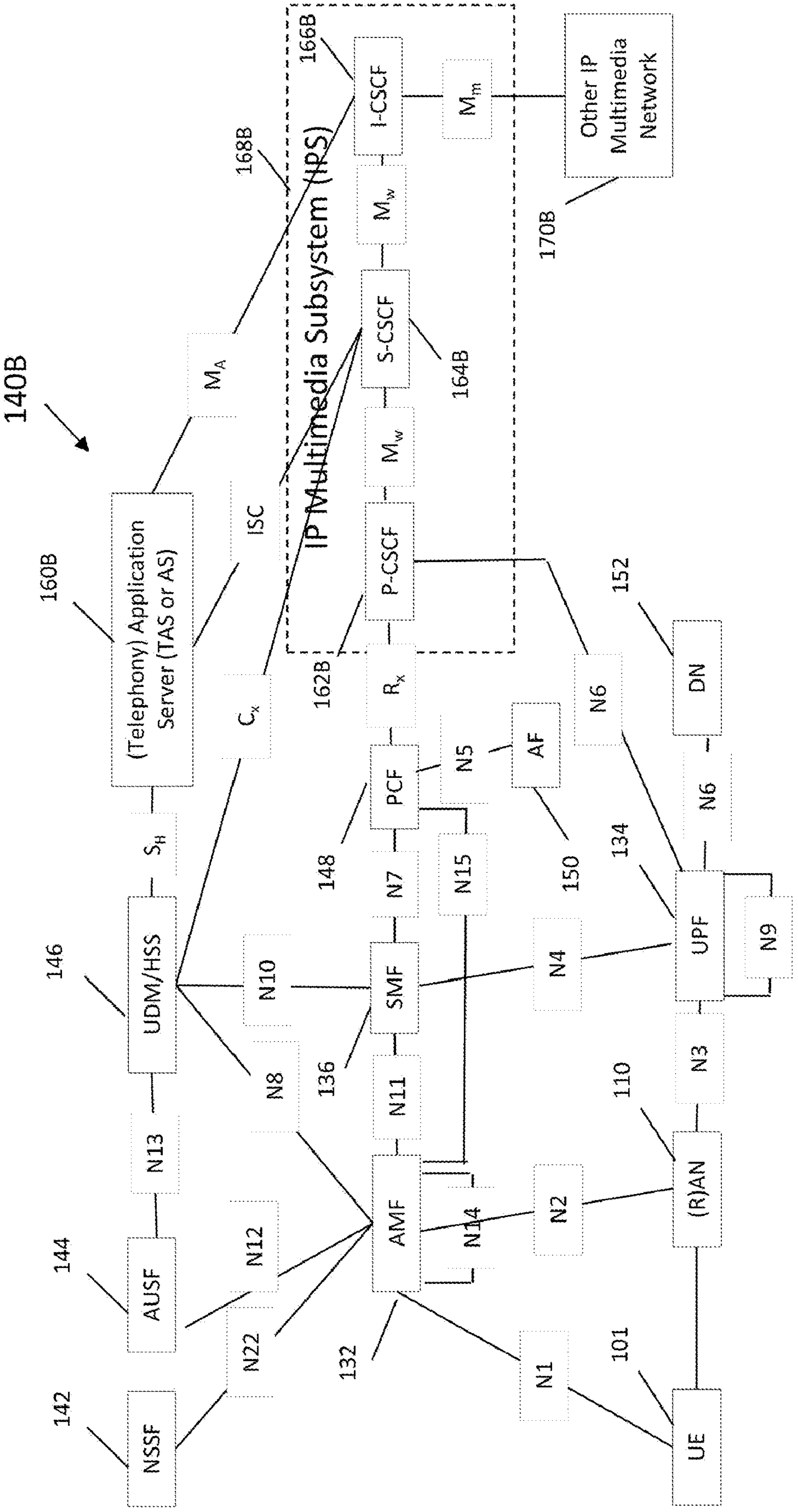
FIG. 1B illustrates a non-roaming 5G system architecture in accordance with some aspects.

FIG. 1B illustrates a non-roaming 5G system architecture in accordance with some aspects. In particular, FIG. 1B illustrates a 5G system architecture 140B in a reference point representation, which may be extended to a 6G system architecture. More specifically, UE 102 can be in communication with RAN 110 as well as one or more other CN network entities. The 5G system architecture 140B includes a plurality of network functions (NFs), such as an AMF 132, session management function (SMF) 136, policy control function (PCF) 148, application function (AF) 150, UPF 134, network slice selection function (NSSF) 142, authentication server function (AUSF) 144, and unified data management (UDM)/home subscriber server (HSS) 146.

The UPF 134 can provide a connection to a data network (DN) 152, which can include, for example, operator services, Internet access, or third-party services. The AMF 132 can be used to manage access control and mobility and can also include network slice selection functionality. The AMF 132 may provide UE-based authentication, authorization, mobility management, etc., and may be independent of the access technologies. The SMF 136 can be configured to set up and manage various sessions according to network policy. The SMF 136 may thus be responsible for session management and allocation of IP addresses to UEs. The SMF 136 may also select and control the UPF 134 for data transfer. The SMF 136 may be associated with a single session of a UE 101 or multiple sessions of the UE 101. This is to say that the UE 101 may have multiple 5G sessions. Different SMFs may be allocated to each session. The use of different SMFs may permit each session to be individually managed. As a consequence, the functionalities of each session may be independent of each other.

The UPF 134 can be deployed in one or more configurations according to the desired service type and may be connected with a data network. The PCF 148 can be configured to provide a policy framework using network slicing, mobility management, and roaming (similar to PCRF in a 4G communication system). The UDM can be configured to store subscriber profiles and data (similar to an HSS in a 4G communication system).

The AF 150 may provide information on the packet flow to the PCF 148 responsible for policy control to support a desired QoS. The PCF 148 may set mobility and session management policies for the UE 101. To this end, the PCF 148 may use the packet flow information to determine the appropriate policies for proper operation of the AMF 132 and SMF 136. The AUSF 144 may store data for UE authentication.

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170B, e.g. an IMS operated by a different network operator.

In some aspects, the UDM/HSS 146 can be coupled to an application server (AS) 160B, which can include a telephony application server (TAS) or another application server. The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1B can also be used.

Figure 1C:
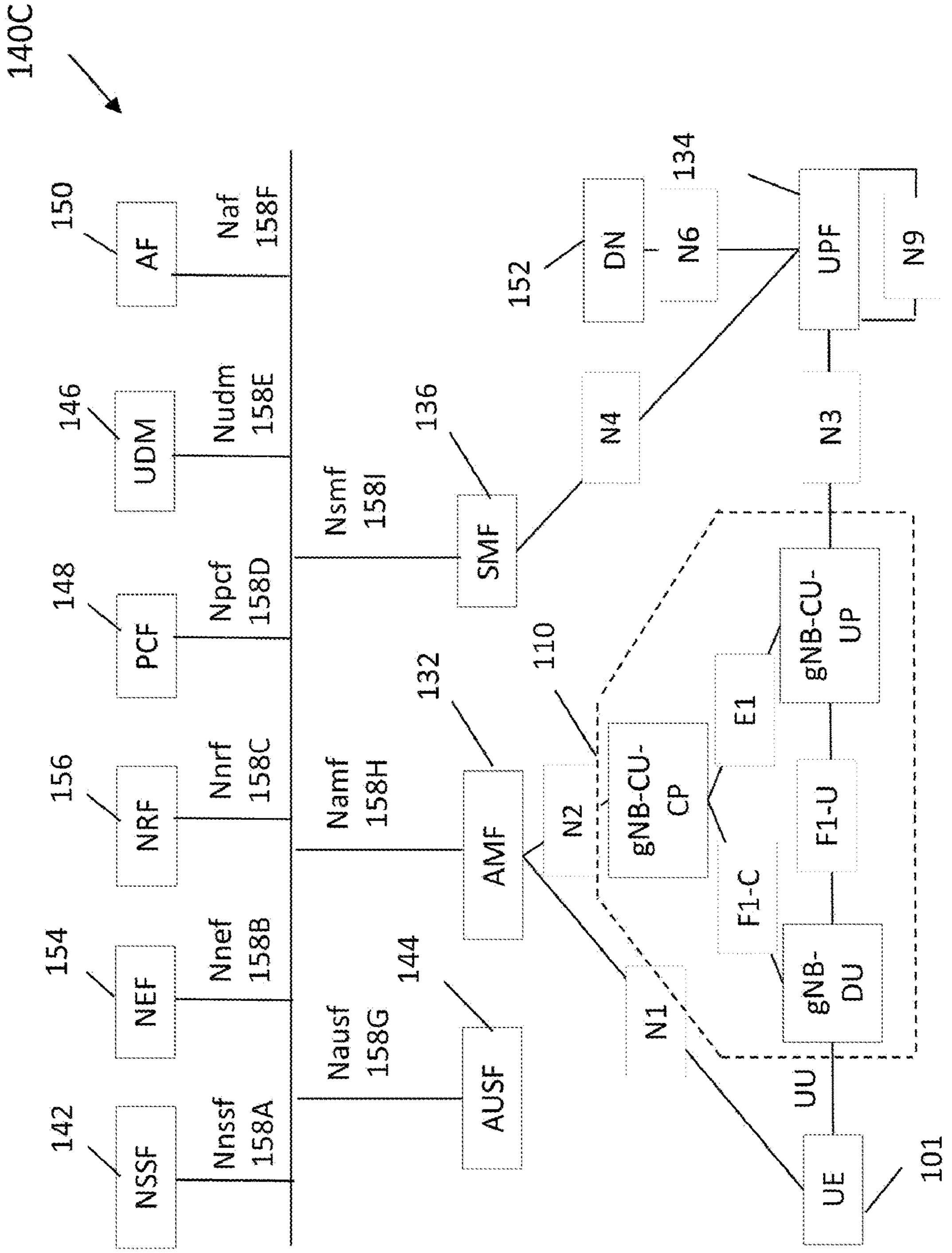
FIG. 1C illustrates a non-roaming 5G system architecture in accordance with some aspects.

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 1581 (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

NR-V2X architectures may support high-reliability low latency sidelink communications with a variety of traffic patterns, including periodic and aperiodic communications with random packet arrival time and size. Techniques disclosed herein can be used for supporting high reliability in distributed communication systems with dynamic topologies, including sidelink NR V2X communication systems.

Figure 2:
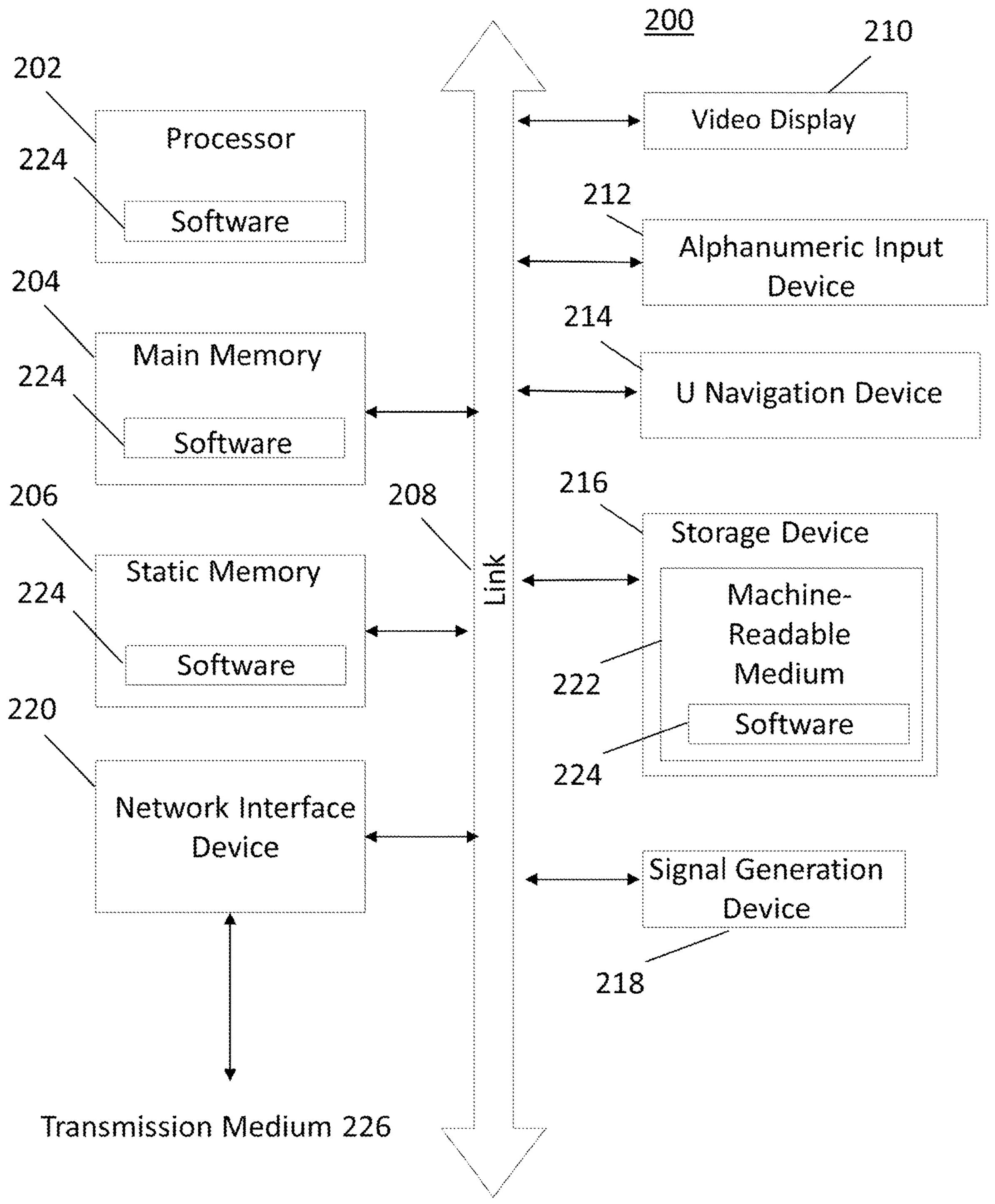
FIG. 2 illustrates a block diagram of a communication device in accordance with some embodiments.

FIG. 2 illustrates a block diagram of a communication device in accordance with some embodiments. The communication device 200 may be a UE such as a specialized computer, a personal or laptop computer (PC), a tablet PC, or a smart phone, dedicated network equipment such as an eNB, a server running software to configure the server to operate as a network device, a virtual device, or any machine capable of executing instructions (sequential or otherwise) that specify actions to be taken by that machine. For example, the communication device 200 may be implemented as one or more of the devices shown in FIGS. 1A-1C. Note that communications described herein may be encoded before transmission by the transmitting entity (e.g., UE, gNB) for reception by the receiving entity (e.g., gNB, UE) and decoded after reception by the receiving entity.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor (or equivalently processing circuitry) 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, completely or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks.

The instructions 224 may further be transmitted or received over a communications network using a transmission medium 226 via the network interface device 220 utilizing any one of a number of wireless local area network (WLAN) transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a next generation (NG)/5$^{th}$ generation (5G) standards among others. In an example, the network interface device 220 may include one or more physical jacks (e.g., Ethernet, coaxial, or phone jacks) or one or more antennas to connect to the transmission medium 226.

Note that the term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" or "processor" as used herein thus refers to, is part of, or includes circuitry capable of sequentially and automatically carrying out a sequence of arithmetic or logical operations, or recording, storing, and/or transferring digital data. The term "processor circuitry" or "processor" may refer to one or more application processors, one or more baseband processors, a physical central processing unit (CPU), a single- or multi-core processor, and/or any other device capable of executing or otherwise operating computer-executable instructions, such as program code, software modules, and/or functional processes.

Any of the radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 5G, 5G New Radio (5G NR), 3GPP 5G New Radio, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth(r), Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p or IEEE 802.11bd and other) Vehicle-to-Vehicle (V2V) and Vehicle-to-X (V2X) and Vehicle-to-Infrastructure (V21) and Infrastructure-to-Vehicle (12V) communication technologies, 3GPP cellular V2X, DSRC (Dedicated Short Range Communications) communication systems such as Intelligent-Transport-Systems and others (typically operating in 5850 MHz to 5925 MHz or above (typically up to 5935 MHz following change proposals in CEPT Report 71)), the European ITS-G5 system (i.e. the European flavor of IEEE 802.11p based DSRC, including ITS-G5A (i.e., Operation of ITS-G5 in European ITS frequency bands dedicated to ITS for safety re-lated applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), DSRC in Japan in the 700 MHz band (including 715 MHz to 725 MHz), IEEE 802.11bd based systems, etc.

Aspects described herein can be used in the context of any spectrum management scheme including dedicated licensed spectrum, unlicensed spectrum, license exempt spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System/CBRS=Citizen Broadband Radio System in 3.55-3.7 GHz and further frequencies). Applicable spectrum bands include IMT (International Mobile Telecommunications) spectrum as well as other types of spectrum/bands, such as bands with national allocation (including 450-470 MHz, 902-928 MHz (note: allocated for example in US (FCC Part 15)), 863-868.6 MHz (note: allocated for example in European Union (ETSI EN 300 220)), 915.9-929.7 MHz (note: allocated for example in Japan), 917-923.5 MHz (note: allocated for example in South Korea), 755-779 MHz and 779-787 MHz (note: allocated for example in China), 790-960 MHz, 1710-2025 MHz, 2110-2200 MHz, 2300-2400 MHz, 2.4-2.4835 GHz (note: it is an ISM band with global availability and it is used by Wi-Fi technology family (11b/g/n/ax) and also by Bluetooth), 2500-2690 MHz, 698-790 MHz, 610-790 MHz, 3400-3600 MHz, 3400-3800 MHz, 3800-4200 MHz, 3.55-3.7 GHz (note: allocated for example in the US for Citizen Broadband Radio Service), 5.15-5.25 GHz and 5.25-5.35 GHz and 5.47-5.725 GHz and 5.725-5.85 GHz bands (note: allocated for example in the US (FCC part 15), consists four U-NII bands in total 500 MHz spectrum), 5.725-5.875 GHz (note: allocated for example in EU (ETSI EN 301 893)), 5.47-5.65 GHz (note: allocated for example in South Korea, 5925-7125 MHz and 5925-6425 MHz band (note: under consideration in US and EU, respectively. Next generation Wi-Fi system is expected to include the 6 GHz spectrum as operating band but it is noted that, as of December 2017, Wi-Fi system is not yet allowed in this band. Regulation is expected to be finished in 2019-2020 time frame), IMT-advanced spectrum, IMT-2020 spectrum (expected to include 3600-3800 MHz, 3800-4200 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), 57-64/66 GHz (note: this band has near-global designation for Multi-Gigabit Wireless Systems (MGWS)/WiGig. In US (FCC part 15) allocates total 14 GHz spectrum, while EU (ETSI EN 302 567 and ETSI EN 301 217-2 for fixed P2P) allocates total 9 GHz spectrum), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) where in particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Aspects described herein can also implement a hierarchical application of the scheme is possible, e.g., by introducing a hierarchical prioritization of usage for different types of users (e.g., low/medium/high priority, etc.), based on a prioritized access to the spectrum e.g., with highest priority to tier-1 users, followed by tier-2, then tier-3, etc. users, etc.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

5G networks extend beyond the traditional mobile broadband services to provide various new services such as internet of things (IoT), industrial control, autonomous driving, mission critical communications, etc. that may have ultra-low latency, ultra-high reliability, and high data capacity requirements due to safety and performance concerns. Some of the features in this document are defined for the network side, such as APs, eNBs, NR or gNBs—note that this term is typically used in the context of 3GPP 5G and 6G communication systems, etc. Still, a UE may take this role as well and act as an AP, eNB, or gNB; that is some or all features defined for network equipment may be implemented by a UE. Note that all 3GPP TS (e.g., 38.213, 38.214, 38.331, etc) herein are incorporated by reference in their entirety.

As above, the 5G NR system was introduced as the evolution of 4G/LTE to provide wider bandwidth and to support a larger amount of traffic, extreme high reliability and low latency, etc. Although it is expected that the 5G network will ultimately replace the 4G network, there is a period of coexistence between the 5G and 4G systems. A 5G carrier may be a neighbor of a 4G carrier. A 5G carrier may also partially or fully overlap in frequency domain with a 4G carrier. Therefore, efficient support of coexistence between 5G and 4G systems, i.e., dynamic spectrum sharing (DSS) is useful during the period of 5G system deployment. In dual connectivity scenarios, the UE may be simultaneously connected to two cells, or more generally two cell groups, a primary cell group (MCG) and a secondary cell group (SCG).

DSS was considered since NR Rel-15. For example, a channel reference signal (CRS) pattern can be configured for a NR UE, so that the physical downlink shared channel (PDSCH) transmission of a NR carrier is able to be rate matched around the resource elements (REs) potentially used by LTE CRS, which mitigates the impact to LTE channel estimation for better LTE downlink (DL) performance. For example, NR transmission should be avoided on the resource used by LTE physical downlink control channel (PDCCH). The consideration of LTE CRS/PDCCH limits the NR PDCCH transmissions. In this case, a PDCCH of an SCell may be used to schedule the PDSCH and/or physical uplink shared channel (PUSCH) transmissions of the PCell, and a PDCCH may be used schedule PDSCH transmission on multiple cells.

Carrier aggregation (CA) may be used to increase the data rate of both uplink and downlink transmissions. Although one motivation is high data rate, energy efficiency is also a metric to be used. Therefore, SCell dormancy behavior was introduced for multi-radio access technology (RAT) dual connectivity (MR-DC) and enhanced CA (eCA) in NR Rel-16. If there is not much traffic, an activated SCell may be switched into a dormant bandwidth part (BWP) to save power, which may also allow quick switching into a non-dormant BWP immediately after an increase in the amount of traffic. Downlink Control Information (DCI) format 1_1 may be used to indicate SCell dormancy switching with or without scheduling a PDSCH transmission.

When a PDCCH of a scheduling SCell can be configured to schedule a transmission on a PCell, the scheduling SCell may be able to be deactivated. Therefore, efficient PDCCH design is an issue to be considered for DSS enhancement.

Figure 3:
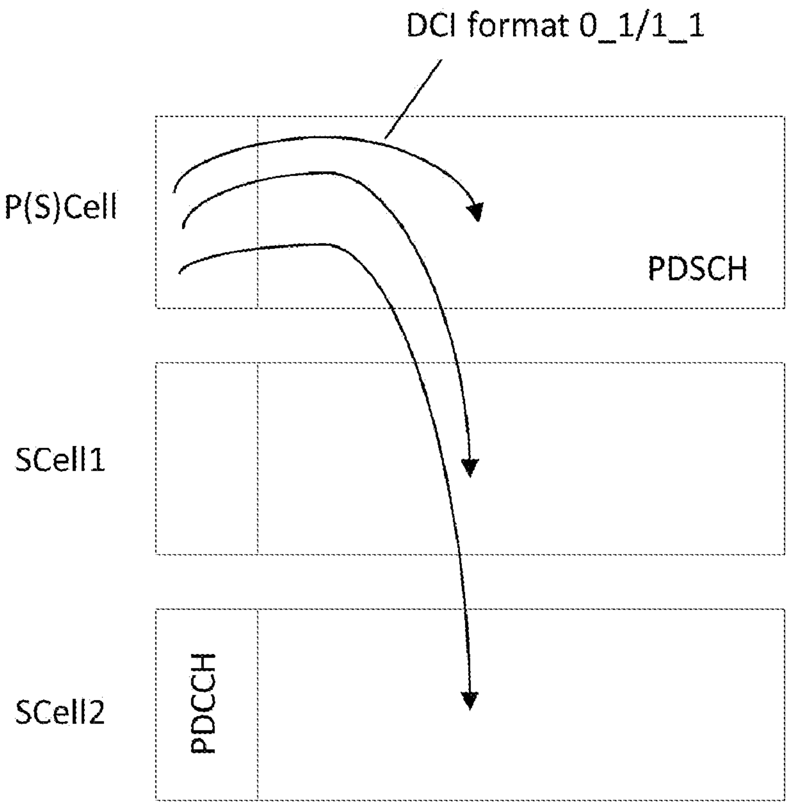
FIG. 3 illustrates cross-carrier scheduling (CCS) with secondary cell (SCell) dormancy switching in accordance with some embodiments.

In general, in cross-carrier scheduling (CCS), the scheduling grants and scheduling assignments are transmitted on a different cell than the corresponding data (i.e., the PDSCH is received on a component carrier (CC) other than the one on which the PDCCH is received). The UE indicates support of CCS with a parameter crossCarrierScheduling under PhyLayerParameters during the UE capability transfer procedure. CCS does not apply to the PCell (the PCell is always scheduled via its own PDCCH). In some embodiments, CCS may be used only to schedule resources on a secondary CC without a PDCCH. For each UE, the gNB can either enable or disable the CCS independently for each CC, via RRC signaling. The CIF in the DCI format indicates for which SCell the DCI is intended. Whether or not the CIF is present in a DCI is configured by the gNB via RRC signaling. CIF value 0 indicates the PCell, while the other SCell can be addressed with the ServCellIndex parameter i.e., CIF value is the same as ServCellIndex. The cif-Presence in the physicalConfigDedicated (PCell configuration) information element (IE) indicates whether CIF is present in the DCI of the PCell. Similarly, each SCell may be configured with CCS as part of an SCell addition or modification. The crossCarrierSchedulingConfig IE provides this information as part of the PhysicalConfigDedicatedSCell IE. The schedulingCellInfo parameter in the crossCarrierSchedulingConfig IE indicates whether CCS is enabled. If the schedulingCellInfo parameter indicates 'own', the SCell transmits its own PDCCH (CCS is not enabled); if the schedulingCellInfo parameter indicates 'other', another 'other' serving cell transmits the DCI. The schedulingCellId parameter indicates to the UE which cell signals downlink allocations and uplink grants for the SCell. When CCS is active for an SCell, it can only be scheduled by one CC, i.e., SCell1 may only receive scheduling information from one, but not both, of the PCell and SCell2. The common search space is always on the primary cell, but the UE-specific search space (USS) can be on the primary cell or on any of the secondary cells. A UE configured with the CIF for a given serving cell assumes that the CIF is not present in any PDCCH of the serving cell in the common search space, but assumes that the CIF is present in the PDCCH located in the USS. FIG. 3 illustrates CCS with SCell dormancy switching in accordance with some embodiments.

Value of CIF Field in the DCI Triggering SCell Dormancy Switching

NR supports dormancy behavior inside active time for a SCell for energy saving. The dormancy behavior is supported based on BWP framework. That is, at least two BWPs are configured on a SCell. One BWP is the dormant BWP, which is configured without PDCCH monitoring. Further, the typically long cycle of channel state information (CSI) reporting may be configured on the dormant BWP. The other BWP(s) may be configured for normal data transmission, i.e., non-dormant BWP(s) for which normal PDCCH monitoring and normal CSI reporting are configured.

The SCell dormancy switching can be triggered by DCI format 0_1 or 1_1 when a PUSCH or a PDSCH is scheduled by the DCI. This is called a Case 1 Scell dormancy indication. Further, a DCI format 1_1 also supports triggering SCell dormancy switching without scheduling a PDSCH, which is called a Case 2 Scell dormancy indication. In DCI format 0_1 and 1_1, there is a SCell dormancy indication field which may be used to indicate the dormant or non-dormant state for up to 5 groups of SCells for Case 1 Scell dormancy indication. On the other hand, for a Case 2 Scell dormancy indication, a special value of a frequency domain resource allocation (FDRA) field in the DCI indicates that no PDSCH transmission is scheduled and SCell dormancy switching respectively for up to 15 SCells is indicated by reinterpreting unused fields in the DCI format 1_1.

When CCS is configured for a UE, the DCI format 0_1/1_1 on the PCell with a carrier indicator field (CIF)+0' is not used for a Case 1 Scell dormancy indication. Further, DCI format 1_1 on the Pcell with CIF≠0' is not used for Case 2 SCell dormancy indication. In self-scheduling, scheduling grants and scheduling assignments for data are transmitted on the same cell as the corresponding data.

When CCS from a scheduling Scell (sSCell) to the primary cell (PCell/PSCell) is configured, CIF=0 used for sSCell self-scheduling, and CIF for sSCell to PCell cross-carrier scheduling is explicitly configured using RRC signaling. If a DCI format on the sSCell indicates SCell dormancy switching, the CIF value in the DCI format should be properly handled. When CCS from the sSCell to PCell/PSCell is configured, the SCell dormancy switching can only be triggered by a DCI format transmitted on the PCell/PSCell. Alternatively, the SCell dormancy switching can be triggered by a DCI format transmitted on the PCell/PSCell or the sSCell.

Figure 4:
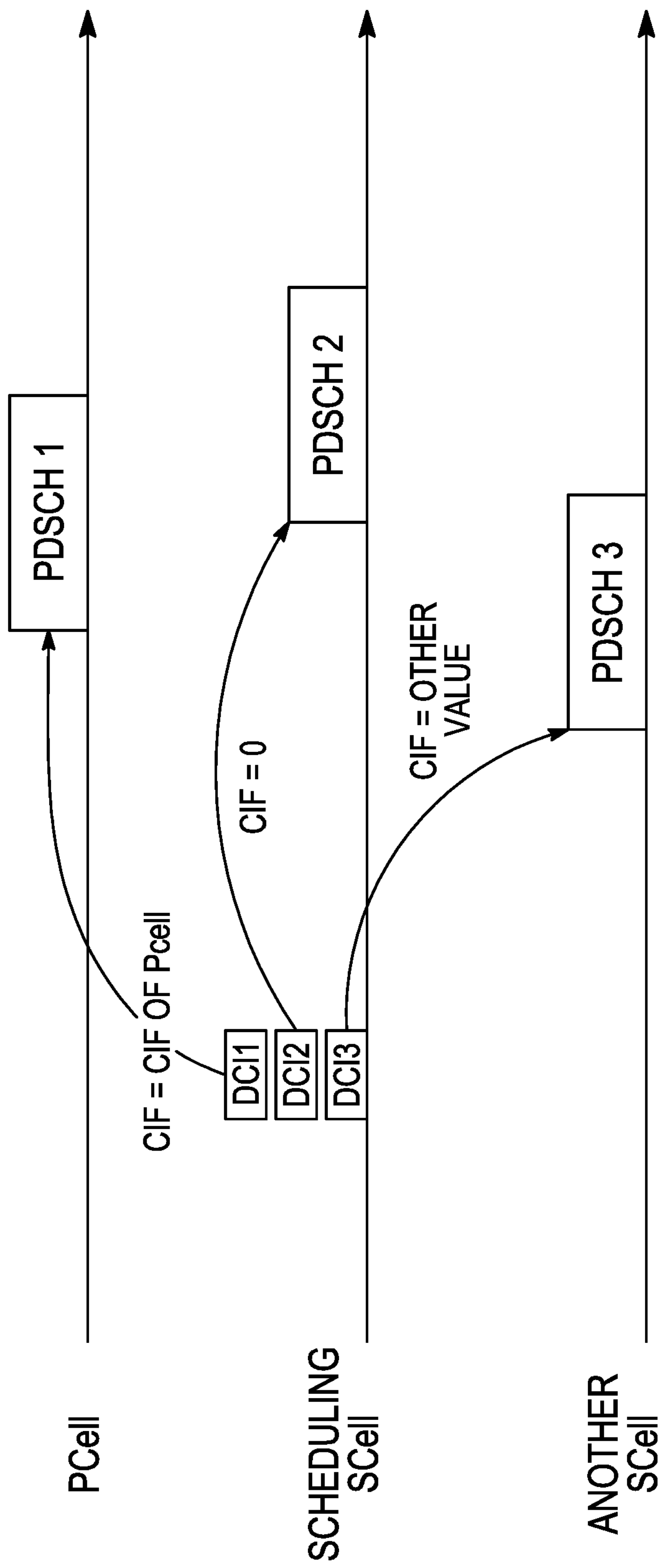
FIG. 4 illustrates CCS with from scheduling SCell (sSCell) to primary cell (PCell) in accordance with some embodiments.

FIG. 4 illustrates CCS with from sSCell to PCell in accordance with some embodiments. CIF=0 used for sSCell self-scheduling of PDSCH 2. A non-zero CIF value is used to indicate the scheduling of a PDSCH 1 on the PCell. The other CIF values can be configured to schedule a transmission on another SCell, e.g., PDSCH 3.

In one embodiment, for a DCI format on the sSCell (e.g., DCI format 0_1 or 1_1) that indicates SCell dormancy switching, the CIF field in the DCI format is only set to a CIF value that is configured to the PCell, to schedule a PUSCH or PDSCH transmission on the PCell. The dormancy switching of each group of SCells is indicated by the SCell dormancy indication field in the DCI format. The DCI format may also trigger BWP switching for the PCell. For example, the UE may currently work on a BWP of the PCell with the most USS sets being configured and monitored on the sSCell. However, since such USS sets become unavailable after the deactivation of the sSCell, the DCI format may trigger the PCell to switch to another BWP with the most USS sets being configured and monitored on the PCell (i.e., self-scheduling). This permits the scheduling performance of the PCell to be maintained even after the sSCell is deactivated.

Figure 5:
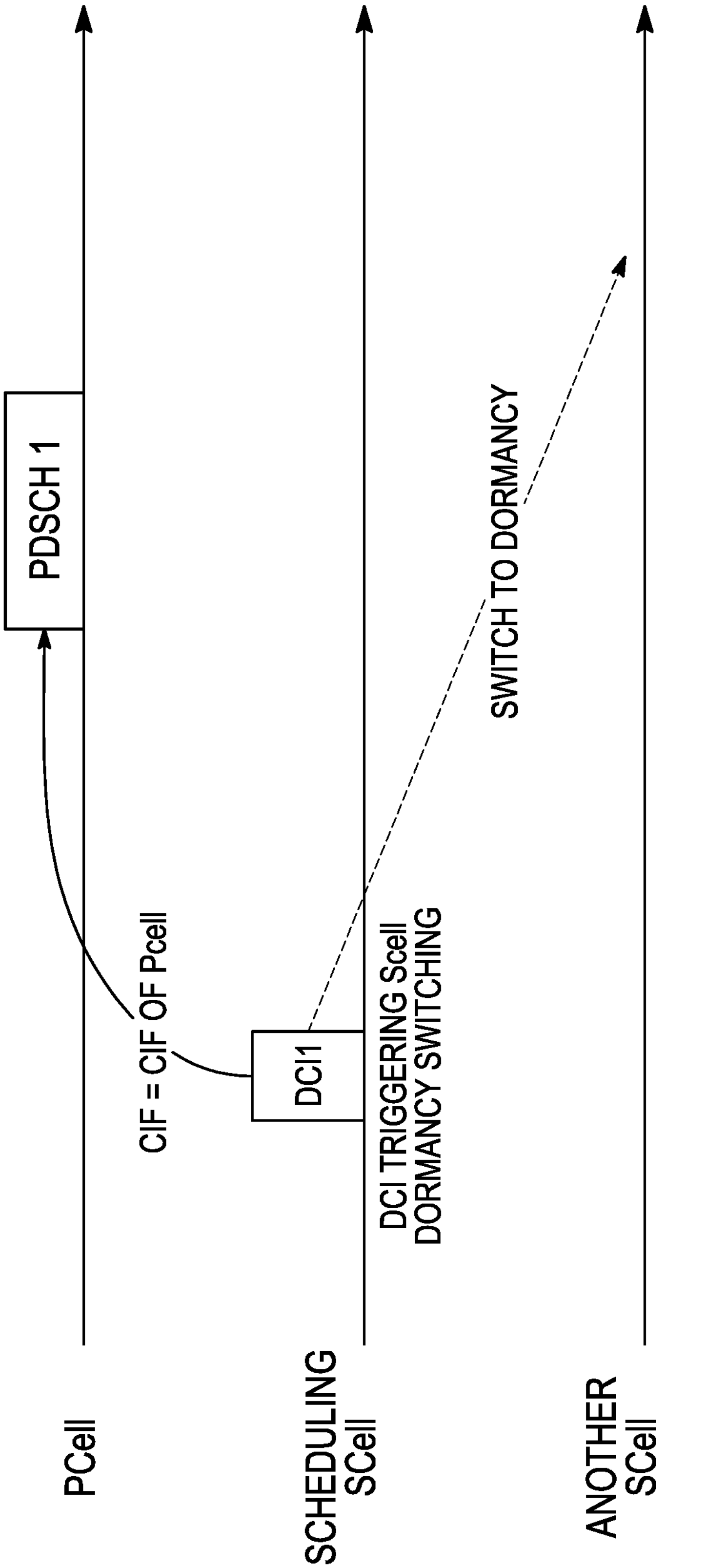
FIG. 5 illustrates SCell dormancy switching in accordance with some embodiments.

FIG. 5 illustrates SCell dormancy switching in accordance with some embodiments. As shown in FIG. 5, the DCI 1 for SCell switching may still schedule a PDSCH transmission on the PCell. Note the CIF field in DCI 1 is set to the CIF value configured for the PCell. DCI 1 can indicate a SCell that will be switched into dormancy operation.

In one embodiment, for a DCI format on the sSCell (e.g., DCI format 1_1) that indicates SCell dormancy switching, the CIF field in the DCI format is only set to the CIF value that is configured to the PCell, without scheduling a PDSCH transmission on the PCell, which can be indicated by a special value of the FDRA field. The dormancy switching of each SCell is indicated by reinterpreting unused fields in the DCI format 1_1. The DCI format may also trigger BWP switching for the PCell. For example, the UE may currently work on a BWP of the PCell with most USS sets being configured and monitored on the sSCell. However, since such USS sets become unavailable after the deactivation of sSCell, the DCI format may trigger the PCell to switch to another BWP with most USS sets being configured and monitored on the PCell (i.e., self-scheduling). This permits the scheduling performance of the PCell to be maintained even after the sSCell is deactivated. With this embodiment, as shown in FIG. 5, DCI 1 for the SCell dormancy indication will not schedule a PDSCH on the PCell.

In one embodiment, for a DCI format on the sSCell (e.g., DCI format 0_1 or 1_1) that indicates SCell dormancy switching, the CIF field in the DCI format is only set to value 0—i.e., the CIF value of the sSCell. The dormancy switching of each group of SCells is indicated by the SCell dormancy indication field. If the SCell group that includes the sSCell is indicated to switch to the dormant state, the scheduled PUSCH or PDSCH on the sSCell by the DCI format is canceled.

In one embodiment, for a DCI format on the sSCell (e.g., DCI format 1_1) that indicates SCell dormancy switching, the CIF field in the DCI format is only set to value 0, i.e., the CIF value of the sSCell, without scheduling a PDSCH transmission on the sSCell, which can be indicated by a special value of the FDRA field. The dormancy switching of each SCell is indicated by reinterpreting unused fields in the DCI format 1_1.

In one embodiment, for a DCI format on the PCell (e.g., DCI format 1_1) that indicates the SCell dormancy switching, the CIF field in the DCI format is only set to a CIF value that is configured to the PCell, or only set to CIF value 0, or the CIF field is ignored. The DCI format may schedule a PUSCH or PDSCH transmission on the PCell by default. The dormancy switching of each group of SCells is indicated by the SCell dormancy indication field. The DCI format may also trigger BWP switching for the PCell. For example, the UE may currently work on a BWP of the PCell with most USS sets being configured and monitored on the sSCell. However, since such USS sets become unavailable after the deactivation of sSCell, the DCI format may trigger the PCell to switch to another BWP with most USS sets being configured and monitored on the PCell (i.e., self-scheduling). This permits the scheduling performance of the PCell to be maintained even after the sSCell is deactivated.

In one embodiment, for a DCI format on the PCell (e.g., DCI format 1_1) that indicates SCell dormancy switching, the CIF field in the DCI format is only set to a CIF value that is configured to the PCell, or only set to CIF value 0, or the CIF field is ignored. The DCI format may not schedule a PDSCH transmission on the PCell, which can be indicated by a special value of the FDRA field. The DCI format may also not schedule a PDSCH transmission on other cells. The dormancy switching of each SCell is indicated by reinterpreting unused fields in the DCI format 1_1. The DCI format may also trigger BWP switching for the PCell. For example, the UE may currently work on a BWP of the PCell with most USS sets being configured and monitored on the sSCell. However, since such USS sets become unavailable after the deactivation of sSCell, the DCI format may trigger the PCell to switch to another BWP with most USS sets being configured and monitored on the PCell (i.e., self-scheduling). This permits the scheduling performance of the PCell to be maintained even after the sSCell is deactivated.

Dormancy Behavior for sSCell

When the CCS from the sSCell to the PCell/PSCell is configured, a PDSCH or PUSCH transmission on the PCell/PSCell can be scheduled by a PDCCH on the sSCell or PCell/PSCell. In addition, a PDSCH or PUSCH transmission on the sSCell can be scheduled by a PDCCH on the sSCell (i.e., self-scheduling). Further, the sSCell may also schedule for the other SCell(s). When the sSCell is deactivated or dormant, the impact on the CCS from the sSCell to the PCell/PSCell or the other SCell(s) should be considered.

In one embodiment, no search space set is configured on the dormant BWP of the sSCell. Consequently, when the sSCell is switched to the dormant BWP, the UE doesn't monitor any PDCCH on the dormant BWP. As a result, a transmission on the PCell/PSCell can no longer be scheduled by the sSCell. However, a transmission on the PCell/PSCell may still be scheduled by a PDCCH on the PCell/PSCell. Further, all the SCell(s) that are configured to be scheduled by the sSCell are unable to be scheduled. It is up to the gNB to configure another cell as the scheduling cell or permit self-scheduling. This maximizes the power saving gain of the sSCell.

In another embodiment, one or more search space set(s) can be configured on the dormant BWP of the sSCell. The configured search space set(s) provide limited support of scheduling for the PCell/PSCell, the sSCell and/or the other SCell(s).

In one option, the configured search space set(s) on the dormant BWP can only be used to schedule a transmission on the PCell. In other words, the self-scheduling for a transmission on the sSCell and the CCS from the sSCell to the other SCell(s) are not supported by the CCS from the sSCell to the PSCell. Since the Pcell is the primary cell for a UE, it is beneficial for the scheduling performance of the PCell to be maintained when the sSCell switches to the dormant BWP, which sacrifices power saving of the sSCell.

In one option, the configured search space set(s) on the dormant BWP can only be used to schedule a transmission on the PCell/PSCell. In other words, self-scheduling for a transmission on the sSCell and the CCS from the sSCell to the other SCell(s) are not supported. With this option, the scheduling performance of the PCell/PSCell is maintained when the sSCell switches to the dormant BWP, which sacrifices power saving of the sSCell.

In one option, the configured search space set(s) on the dormant BWP can be used to schedule a transmission on the PCell/PSCell or for self-scheduling on the sSCell. In this case, the gNB may be limited to be unable to schedule a transmission on the sSCell. Alternatively, it may be up to the gNB implementation whether or not to schedule a transmission on the sSCell. Further, the CCS from the sSCell to the other SCell(s) is not supported. With this option, the gNB may be able to transmit a DCI format (e.g., format 0_1 or 1_1) on the dormant BWP of the sSCell to switch the sSCell to a non-dormant BWP without a scheduled PDSCH or PUSCH transmission.

In one option, the configured search space set(s) on the dormant BWP can be used to schedule a transmission on the PCell/PSCell or on the other SCell(s). In other words, only self-scheduling of the sSCell is not supported.

In one option, the configured search space set(s) on the dormant BWP can be used to schedule a transmission on the PCell/PSCell, on the other SCell(s), or for self-scheduling on the sSCell. In this case, the gNB may be limited to be unable to schedule a transmission on the sSCell. Alternatively, it may be up to the gNB implementation whether or not to schedule a transmission on the sSCell. With this option, it is possible that the gNB can transmit a DCI format (e.g., format 0_1 or 1_1) on the dormant BWP of the sSCell to switch the sSCell to a non-dormant BWP without a scheduled PDSCH or PUSCH transmission.

Search Space Sharing Across Cells

When the CCS from the sSCell to PCell/PSCell is configured, for the PDCCH monitoring on the sSCell, if the size of a first DCI format for the PCell/PSCell is equal to the size of a second DCI format for the sSCell or any SCell scheduled by the sSCell, a PDCCH candidate of the second DCI format can be used to carry the first DCI format.

Figure 6:
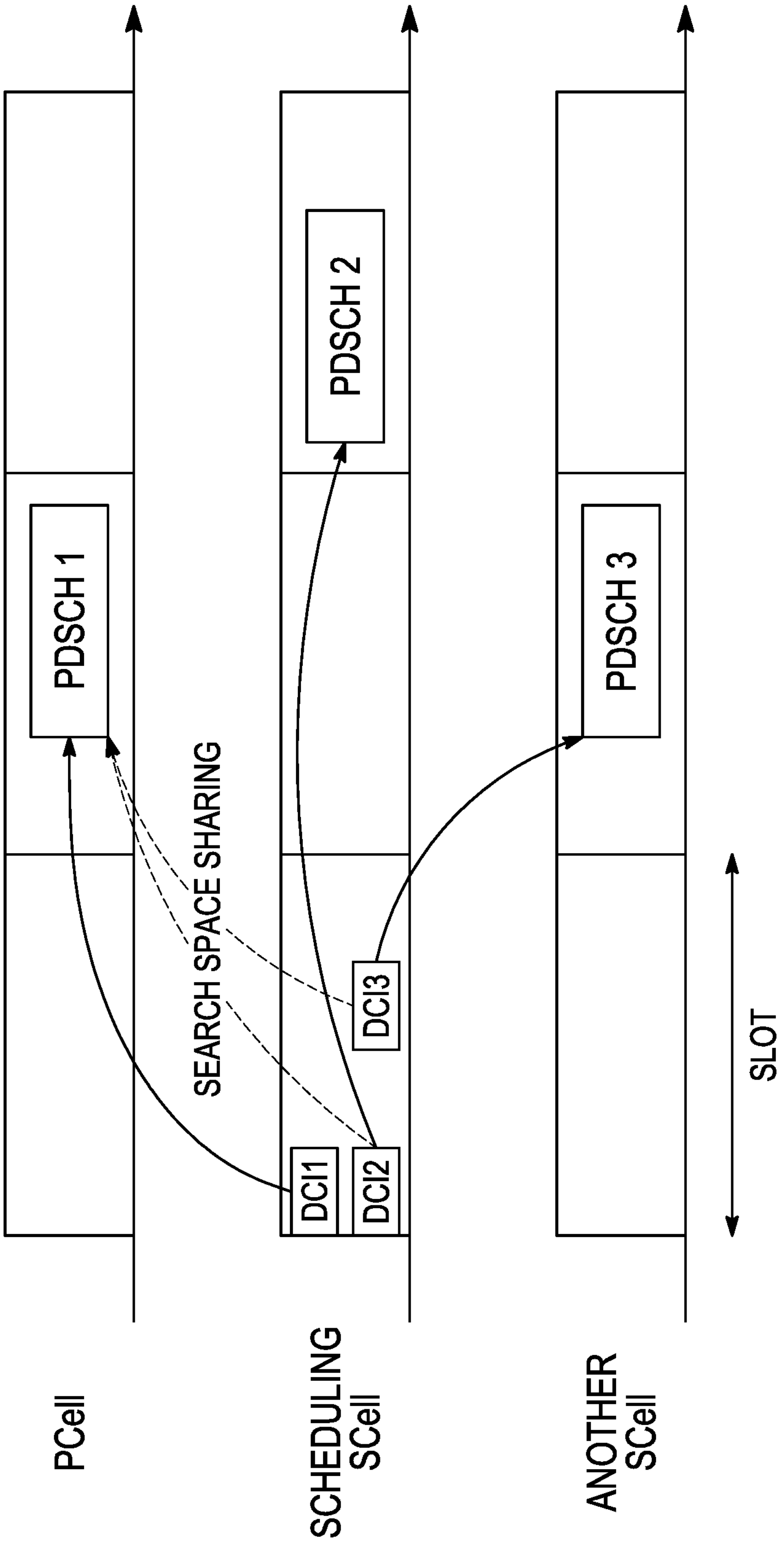
FIG. 6 illustrates search space set sharing in accordance with some embodiments.

FIG. 6 illustrates search space set sharing in accordance with some embodiments. FIG. 6 illustrates an example when the CCS from the sSCell to PCell/PSCell is configured. With a limitation on DCI size, CORESET, and PDCCH aggregation level, DCI 2 and DCI 3 that are configured for scheduling of a transmission (PDSCH 2 or 3) on the sSCell or another SCell can be used to schedule a transmission (PDSCH 1) on the PCell.

In one embodiment, if the CCS from the sSCell to the PCell/PSCell is configured, for the PDCCH monitoring on the sSCell, a UE that: 1) indicates support of search space sharing through searchSpaceSharingCA-UL or through searchSpaceSharingCA-DL, and 2) has a PDCCH candidate with a Control Channel Element (CCE) aggregation level L in Control Resource Set (CORESET) p for a first DCI format scheduling PUSCH transmission or uplink (UL) grant Type 2 PUSCH release, or for a second DCI format scheduling PDSCH reception, or SPS PDSCH release, or indicating SCell dormancy if supported, or indicating a request for a Type-3 HARQ-ACK codebook report without scheduling a PDSCH reception, having a first size and associated with serving cell $n_{CI,2}$, $n_{CI,2}$ is the CIF value configured to the PCell/PSCell, can receive a corresponding PDCCH through a PDCCH candidate with CCE aggregation level L in CORESET p for a first DCI format or for a second DCI format, respectively, having a second size and associated with serving cell $n_{CI,1}$ if the first size and the second size are same, $n_{CI,1}$ is the CIF value configured to the sSCell or any SCell that is scheduled by the sSCell. In another option, $n_{CI,1}$ is only the CIF value configured to the sSCell. The potential limitation on the PDCCH candidate associated with serving cell $n_{CI,1}$ is detailed in following options.

In one option, any PDCCH candidate associated with serving cell $n_{CI,1}$ can be reused to schedule serving cell $n_{CI,2}$ if the above condition is satisfied. For example, in FIG. 6, both DCI 2 and DCI 3 can be used to schedule the transmission on the PCell without a limitation on the PDCCH monitoring occasion in the slot.

In another option, the PDCCH candidate associated with serving cell $n_{CI,1}$ is in a span of n consecutive symbols in the duration spanning the P(S)Cell slot. The n consecutive symbols could be n consecutive symbols with the sub-carrier spacing (SCS) of the P(S)Cell, or n consecutive symbols with the SCS of sSCell. The span may be the first n consecutive OFDM symbols in the duration spanning the P(S)Cell slot. For example, in FIG. 6, DCI 3 cannot be shared to schedule a transmission on PCell since DCI 3 is not transmitted in the beginning part of the slot. Alternatively, the span is any n consecutive OFDM symbols in the duration spanning the P(S)Cell slot. Alternatively, if a duration spanning P(S)Cell slot overlaps with N sSCell slots, there can be at most one span with the PDCCH candidate associated with serving cell $n_{CI,1}$ in each of the N sSCell slots. Alternatively, there can be at most two spans with the PDCCH candidate associated with serving cell $n_{CI,1}$ in each of the N sSCell slots. In this option, all PDCCH candidates associated with serving cell $n_{CI,1}$ that are reused to schedule serving cell $n_{CI,2}$ may be restricted to the same span of n OFDM symbols.

In another option, if the PDCCH candidate associated with serving cell $n_{CI,2}$ is present within a duration spanning the PCell/PSCell slot, the PDCCH candidate associated with serving cell $n_{CI,1}$ must be in the same span of n consecutive symbols as the PDCCH candidate associated with serving cell $n_{CI,2}$. The value n is predefined or configured by high layer signaling, e.g., n=3. Otherwise, if the PDCCH candidate associated with serving cell $n_{CI,2}$ is not present within a duration spanning the P(S)Cell slot, the PDCCH candidate associated with serving cell $n_{CI,1}$ is in a span of n consecutive symbols in the duration spanning the P(S)Cell slot. The n consecutive symbols could be n consecutive symbols with the SCS of the P(S)Cell, or n consecutive symbols with the SCS of the sSCell. The span is the first n consecutive OFDM symbols in the duration spanning the P(S)Cell slot. Alternatively, the span may be any n consecutive OFDM symbols in the duration spanning the P(S)Cell slot. Alternatively, if a duration spanning the P(S)Cell slot overlaps with N sSCell slots, there can be at most one span with the PDCCH candidate associated with serving cell $n_{CI,1}$ in each of the N sSCell slots. Alternatively, there can be at most two spans with the PDCCH candidate associated with serving cell $n_{CI,1}$ in each of the N sSCell slots. In this option, all PDCCH candidates associated with serving cell $n_{CI,1}$ that are reused to schedule serving cell $n_{CI,2}$ may be restricted to the same span of n OFDM symbols.

In one embodiment, if the CCS from the sSCell to PCell/PSCell is configured, for the PDCCH monitoring on the sSCell, a UE that has a PDCCH candidate with CCE aggregation level L in CORESET p for a first DCI format scheduling PUSCH transmission or UL grant Type 2 PUSCH release, or for a second DCI format scheduling PDSCH reception, or SPS PDSCH release, or indicating SCell dormancy if supported, or indicating a request for a Type-3 HARQ-ACK codebook report without scheduling a PDSCH reception, having a first size and associated with serving cell $n_{CI,2}$, $n_{CI,2}$ is the CIF value configured to the PCell/PSCell, can receive a corresponding PDCCH through a PDCCH candidate with CCE aggregation level L in CORESET p for a first DCI format or for a second DCI format, respectively, having a second size and associated with serving cell $n_{CI,1}$ if the first size and the second size are same, $n_{CI,1}$ is the CIF value configured to the sSCell or any SCell that is scheduled by the sSCell. In another option, $n_{CI,1}$ is only the CIF value configured to the sSCell. In this embodiment, search space sharing for the PCell/PSCell is supported that is independent from the configuration of searchSpaceSharingCA-UL or searchSpaceSharingCA-DL. The potential limitation on the PDCCH candidate associated with serving cell $n_{CI,1}$ is detailed in following options.

In one option, any PDCCH candidate associated with serving cell $n_{CI,1}$ can be reused to schedule serving cell $n_{CI,2}$ if the above condition is satisfied. For example, in FIG. 6, both DCI 2 and DCI 3 can be used to schedule the transmission on PCell without a limitation on the PDCCH monitoring occasion in the slot by default.

In another option, the PDCCH candidate associated with serving cell $n_{CI,1}$ is in a span of n consecutive symbols in the duration spanning the P(S)Cell slot. The n consecutive symbols could be n consecutive symbols with the SCS of the P(S)Cell, or n consecutive symbols with the SCS of the sSCell. The span is the first n consecutive OFDM symbols in the duration spanning P(S)Cell slot. For example, in FIG. 6, DCI 3 cannot be shared to schedule a transmission on PCell since DCI 3 is not transmitted in the beginning part of the slot. Alternatively, the span may be any n consecutive OFDM symbols in the duration spanning the P(S)Cell slot. Alternatively, if a duration spanning the P(S)Cell slot overlaps with N sSCell slots, there can be at most one span with the PDCCH candidate associated with serving cell $n_{CI,1}$, in each of the N sSCell slots. Alternatively, there can be at most two spans with the PDCCH candidate associated with serving cell $n_{CI,1}$ in each of the N sSCell slots. In this option, all PDCCH candidates associated with serving cell $n_{CI,1}$ that are reused to schedule serving cell $n_{CI,2}$ may be restricted to the same span of n OFDM symbols.

In another option, if the PDCCH candidate associated with serving cell $n_{CI,2}$ is present within a duration spanning the PCell/PSCell slot, the PDCCH candidate associated with serving cell $n_{CI,1}$ must be in the same span of n consecutive symbols as the PDCCH candidate associated with serving cell $n_{CI,2}$. The value n is predefined or configured by high layer signaling, e.g., n=3. Otherwise, if the PDCCH candidate associated with serving cell $n_{CI,2}$ is not present within a duration spanning the P(S)Cell slot, the PDCCH candidate associated with serving cell $n_{CI,1}$ is in a span of n consecutive symbols in the duration spanning the P(S)Cell slot. The n consecutive symbols could be n consecutive symbols with the SCS of the P(S)Cell, or n consecutive symbols with the SCS of the sSCell. The span is the first n consecutive OFDM symbols in the duration spanning the P(S)Cell slot. Alternatively, the span may be any n consecutive OFDM symbols in the duration spanning the P(S)Cell slot. Alternatively, if a duration spanning the P(S)Cell slot overlaps with N sSCell slots, there can be at most one span with the PDCCH candidate associated with serving cell $n_{CI,1}$ in each of the N sSCell slots. Alternatively, there can be at most two spans with the PDCCH candidate associated with serving cell $n_{CI,1}$ in each of the N sSCell slots. In this option, all PDCCH candidates associated with serving cell $n_{CI,1}$ that are reused to schedule serving cell $n_{CI,2}$ may be restricted to the same span of n OFDM symbols.

The IE CrossCarrierSchedulingConfig is used to specify the configuration when the cross-carrier scheduling is used in a cell.

CrossCarrierSchedulingConfig Information Element

```
-- ASN1START
-- TAG-CROSSCARRIERSCHEDULINGCONFIG-START
CrossCarrierSchedulingConfig ::=                SEQUENCE {
   schedulingCellInfo                           CHOICE {
      own                      SEQUENCE {              -- Cross carrier
scheduling: scheduling cell
         cif-Presence                           BOOLEAN
      },
      other                    SEQUENCE {              -- Cross carrier
scheduling: scheduled cell
         schedulingCellId                       ServCellIndex,
         cif-InSchedulingCell                   INTEGER (1..7)
      }
   },
   ...,
   [[
   carrierIndicatorSize-r16       SEQUENCE {
      carrierIndicatorSizeDCI-1-2-r16                 INTEGER (0..3),
      carrierIndicatorSizeDCI-0-2-r16                 INTEGER (0..3)
   }                                                  OPTIONAL, -- Cond
CIF-PRESENCE
   enableDefaultBeamForCCS-r16                  ENUMERATED {enabled}
OPTIONAL -- Need S
   ]],
   [[
   ccs-BlindDetectionSplit-r17                ENUMERATED {oneSeventh,
threeFourteenth, twoSeventh, threeSeventh,
            oneHalf, fourSeventh, fiveSeventh, spare1}
OPTIONAL -- Need R
   ]]
}
-- TAG-CROSSCARRIERSCHEDULINGCONFIG-STOP
-- ASN1STOP
```

| CrossCarrierSchedulingConfig field descriptions |
|---|
| carrierIndicatorSizeDCI-0-2, carrierIndicatorSizeDCI-1-2<br>Configures the number of bits for the field of carrier indicator in PDCCH DCI format 0_2/1_2. The field carrierIndicatorSizeDCI-0-2 refers to DCI format 0_2 and the field carrierIndicatorSizeDCI-1-2 refers to DCI format 1_2, respectively (see TS 38.212, clause 7.3.1 and TS 38.213, clause 10.1). |
| ccs-BlindDetectionSplit<br>Indicates the share of blind detection candidates and non-overlapping CCEs for PDCCH monitoring on an SpCell and an SCell when cross-carrier scheduling is configured from the SCell for the SpCell (see TS 38.213, clause 10.1.1). The network only configures this field when it sets the field other for an SpCell, i.e., when it configures cross-carrier scheduling of the SpCell by a PDCCH on an Scell. |
| cif-Presence<br>The field is used to indicate whether carrier indicator field is present (value true) or not (value false) in PDCCH DCI formats, see TS 38.213. If cif-Presence is set to true, the CIF value indicating a grant or assignment for this cell is 0. |
| cif-InSchedulingCell<br>The field indicates the CIF value used in the scheduling cell to indicate a grant or assignment applicable for this cell, see TS 38.213. If configured for an SpCell, the non-fallback DCI formats on the SpCell include same number of CIF bits as the corresponding non-fallback DCI formats on the scheduling cell, and the CIF bits are considered reserved. |
| enableDefaultBeamForCCS<br>This field indicates whether default beam selection for cross-carrier scheduled PDSCH is enabled, see TS 38.214. If not present, the default beam selection behaviour is not applied, i.e. Rel-15 behaviour is applied. This field can only be configured in the cross-scheduled SCell or SpCell. |
| other<br>Parameters for cross-carrier scheduling. If configured for an SpCell, the SpCell can be scheduled by the PDCCH on another SCell as well as by the PDCCH on the SpCell. If configured for an SCell, the SCell is scheduled by a PDDCH on another cell. |
| own<br>Parameters for self-scheduling, i.e., a serving cell is scheduled by its own PDCCH. |

-continued

| CrossCarrierSchedulingConfig field descriptions |
| --- |
| carrierIndicatorSizeDCI-0-2, carrierIndicatorSizeDCI-1-2<br>Configures the number of bits for the field of carrier indicator in PDCCH DCI format 0_2/1_2. The field carrierIndicatorSizeDCI-0-2 refers to DCI format 0_2 and the field carrierIndicatorSizeDCI-1-2 refers to DCI format 1_2, respectively (see TS 38.212, clause 7.3.1 and TS 38.213, clause 10.1).<br>ccs-BlindDetectionSplit<br>Indicates the share of blind detection candidates and non-overlapping CCEs for PDCCH monitoring on an SpCell and an SCell when cross-carrier scheduling is configured from the SCell for the SpCell (see TS 38.213, clause 10.1.1). The network only configures this field when it sets the field other for an SpCell, i.e., when it configures cross-carrier scheduling of the SpCell by a PDCCH on an Scell.<br>schedulingCellId<br>If configured for a SpCell, this field indicates which SCell, in addition to the SpCell, signals the downlink allocations and uplink grants, if applicable, for the concerned SpCell. If configured for a Scell, this field indicates which cell signals the downlink allocations and uplink grants, if applicable, for the concerned SCell. In case the UE is configured with DC, the scheduling cell is part of the same cell group (i.e. MCG or SCG) as the scheduled cell. In case the UE is configured with two PUCCH groups, the scheduling cell and the scheduled cell are within the same PUCCH group. If drx-ConfigSecondaryGroup is configured in the MAC-CellGroupConfig associated with this serving cell, the scheduling cell and the scheduled cell belong to the same Frequency Range. In addition, the serving cell with an aperiodic CSI trigger and the PUSCH resource scheduled for the report are on the same carrier and serving cell, but the cell for which CSI is reported may belong to the same or a different Frequency Range. The network should not trigger a CSI request for a serving cell in the other Frequency Range when that serving cell is outside Active Time. |

| Conditional Presence | Explanation |
| --- | --- |
| CIF-PRESENCE | The field is mandatory present if the cif-Presence is set to true. The field is absent otherwise. |

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus for a user equipment (UE) configured for operation in a fifth-generation new radio (5G NR) network, the apparatus comprising: processing circuitry; and memory, wherein the processing circuitry is configured to:

encode a UE capability information element for transmission to a gNode B (gNB) indicating that the UE supports cross-carrier scheduling;

decode radio-resource control (RRC) signalling received from the gNB, the RRC signalling comprising a CrossCarrierSchedulingConfig information element (IE) to configure the UE with a cross-carrier scheduling configuration, the cross-carrier scheduling configuration indicating that a serving cell is cross-carrier scheduled by a scheduling secondary cell (SCell) and that the serving cell is a special cell (SpCell) which is cross-carrier scheduled by the SCell;

decode a DCI format 0_1 received from the gNB on a physical downlink control channel (PDCCH) of the scheduling SCell, the DCI format 0_1 cross-carrier scheduling a transmission on a primary cell (PCell), the DCI format 0_1 including a carrier indicator field (CIF) and an SCell dormancy indication field;

interpret the CIF in accordance with the cross-carrier scheduling configuration; and refrain from further monitoring the PDCCH of the scheduling SCell based on information indicated in the DCI format 0_1 that the SCell is deactivated.

2. The apparatus of claim 1, wherein the CrossCarrierSchedulingConfig IE includes a scheduling cell information field comprising one of 'own' and 'other', and wherein when the scheduling cell information field indicates 'other', the scheduling cell information field includes parameters for cross-carrier scheduling the SpCell by a PDCCH on another SCell.

3. The apparatus of claim 2, wherein when the scheduling cell information indicates 'own', the scheduling cell information includes parameters for self-scheduling in which the serving cell is scheduled by a PDCCH on the serving cell.

4. The apparatus of claim 1, wherein the carrier indicator field includes a value to indicate SCell dormancy switching.

5. The apparatus of claim 1, wherein the DCI format 0_1 triggers bandwidth part (BWP) switching, and wherein the processing circuitry is to configure the UE to switch to a BWP for PDCCH monitoring of another SCell.

6. The apparatus of claim 1, wherein the RRC signalling comprises an indicator of a dormant BWP of the SCell, and the SCell dormancy indication field of the DCI format 0_1 triggers SCell dormancy.

7. The apparatus of claim 1, wherein the DCI format 0_1 cross-carrier schedules a PUSCH transmission on the PCell from the PDCCH of the SCell, wherein a carrier of the PCell is indicated by the CIF.

8. A non-transitory computer-readable storage medium that stores instructions for execution by processing circuitry of a user equipment (UE) configured for operation in a fifth-generation new radio (5G NR) network, the processing circuitry configured to:

encode a UE capability information element for transmission to a gNode B (gNB) indicating that the UE supports cross-carrier scheduling;

decode radio-resource control (RRC) signalling received from the gNB comprising a CrossCarrierSchedulingConfig information element (IE) to configure the UE with a cross-carrier scheduling configuration, the cross-carrier scheduling configuration indicating that a serving cell is cross-carrier scheduled a scheduling secondary cell (SCell) and that the serving cell is a special cell (SpCell) which is cross-carrier scheduled by the SCell;

decode a DCI format 0_1 received from the gNB on a physical downlink control channel (PDCCH) of the scheduling SCell, the DCI format 0_1 cross-carrier scheduling a transmission on a primary cell (PCell), the DCI format 0_1 including a carrier indicator field (CIF) and an SCell dormancy indication field;

interpret the CIF in accordance with the cross-carrier scheduling configuration; and refrain from further monitoring the PDCCH of the scheduling SCell based on information indicated in the DCI format 0_1 that the SCell is deactivated.

9. The non-transitory computer-readable storage medium of claim 8, wherein the CrossCarrierSchedulingConfig IE includes a scheduling cell information field comprising one of 'own' and 'other', and wherein when the scheduling cell information field indicates 'other', the scheduling cell information field includes parameters for cross-carrier scheduling the SpCell by a PDCCH on another SCell.

10. The non-transitory computer-readable storage medium of claim 9, wherein when the scheduling cell information indicates 'own', the scheduling cell information includes parameters for self-scheduling in which the serving cell is scheduled by a PDCCH on the serving cell.

11. The non-transitory computer-readable storage medium of claim 8, wherein the carrier indicator field includes a value to indicate SCell dormancy switching.

12. The non-transitory computer-readable storage medium of claim 8, wherein the DCI format 0_1 triggers bandwidth part (BWP) switching, and wherein the processing circuitry is to configure the UE to switch to a BWP for PDCCH monitoring of another SCell.

13. The non-transitory computer-readable storage medium of claim 8, wherein the RRC signalling comprises an indicator of a dormant BWP of the SCell, and the SCell dormancy indication field of the DCI format 0_1 triggers SCell dormancy.

14. The non-transitory computer-readable storage medium of claim 8, wherein the DCI format 0_1 cross-carrier schedules a PUSCH transmission on the PCell from the PDCCH of the SCell, wherein a carrier of the PCell is indicated by the CIF.

15. An apparatus for generation Node B (gNB) configured for operation in a fifth-generation new radio (5G NR) network, the apparatus comprising: processing circuitry;

and memory, wherein the processing circuitry is configured to:

decode a user equipment (UE) capability information element received from a UE indicating that the UE supports cross-carrier scheduling;

encode radio-resource control (RRC) signalling for transmission to the UE comprising a CrossCarrierSchedulingConfig information element (IE) to configure the UE with a cross-carrier scheduling configuration, the cross-carrier scheduling configuration indicating that a serving cell is cross-carrier scheduled a scheduling secondary cell (SCell) and that the serving cell is a special cell (SpCell) which is cross-carrier scheduled by the SCell;

encode a DCI format 0_1 for transmission to the UE on a physical downlink control channel (PDCCH) of the scheduling SCell, the DCI format 0_1 cross-carrier scheduling a transmission on a primary cell (PCell), the DCI format 0_1 including a carrier indicator field (CIF) and an SCell dormancy indication field, the CIF to be interpreted by the UE in accordance with the cross-carrier scheduling configuration; and deactivate the scheduling SCell based as indicated in the DCI format 0_1.

16. The apparatus of claim 15, wherein the CrossCarrierSchedulingConfig IE includes a scheduling cell information field comprising one of ‘own’ and ‘other’, and wherein when the scheduling cell information field indicates ‘other’, the scheduling cell information field includes parameters for cross-carrier scheduling the SpCell by a PDCCH on another SCell.

17. The apparatus of claim 16, wherein when the scheduling cell information indicates ‘own’, the scheduling cell information includes parameters for self-scheduling in which the serving cell is scheduled by a PDCCH on the serving cell.

* * * * *